Oct. 11, 1932.  A. V. McKENZIE  1,881,823
ARTIFICIAL FISH BAIT
Filed Dec. 17, 1931
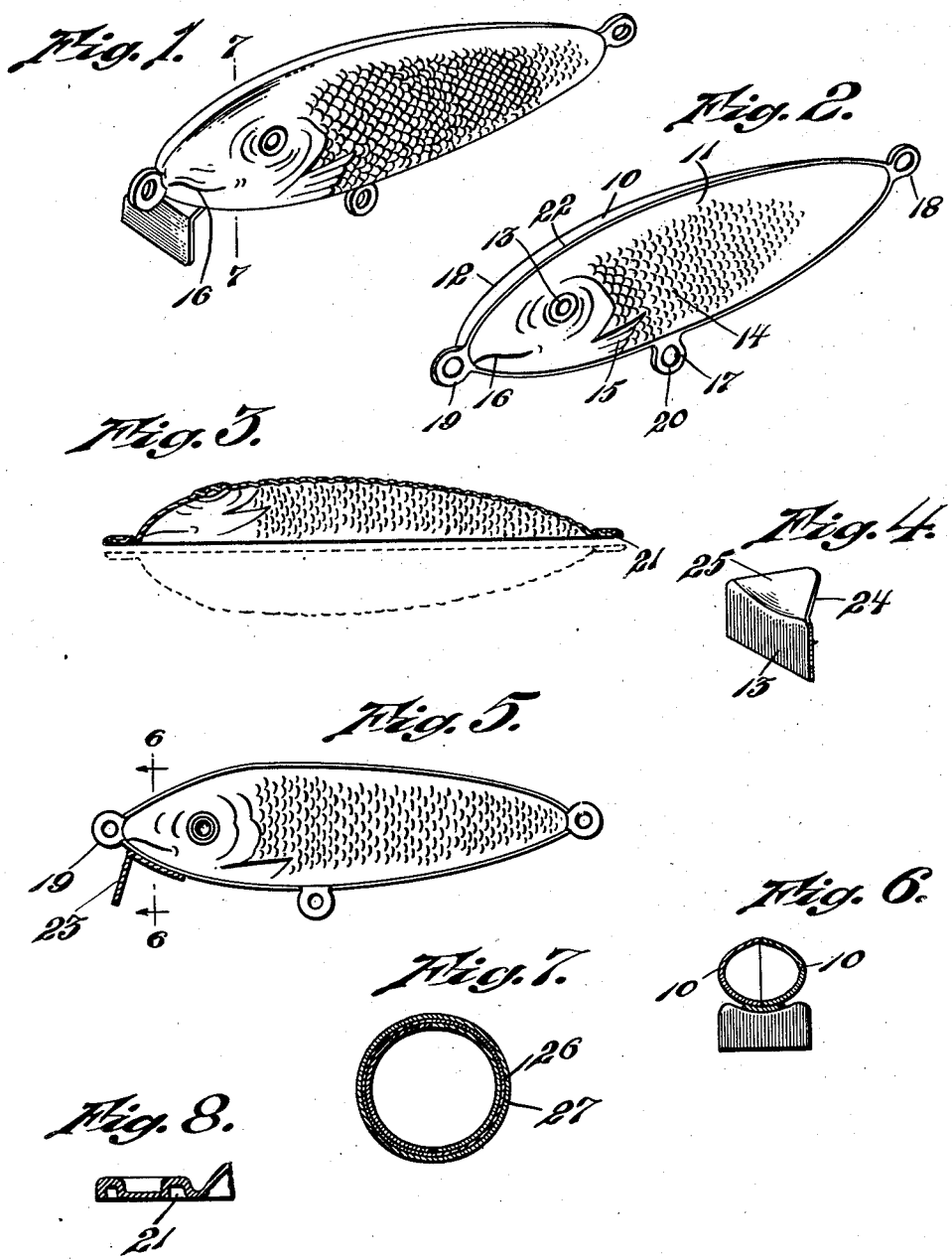
INVENTOR.
Austin V. McKenzie
BY Barlow & Barlow
ATTORNEYS.

Patented Oct. 11, 1932

1,881,823

UNITED STATES PATENT OFFICE

AUSTIN V. McKENZIE, OF PROVIDENCE, RHODE ISLAND

ARTIFICIAL FISH BAIT

Application filed December 17, 1931. Serial No. 581,676.

This invention relates to an artificial fish bait and has for one of its objects to provide an attractive finish on a bait of this character which will float.

Another object of the invention is to provide a metal bait which will float and which may be finished with a surface to provide the animate features of a living minnow or fish to cause the same to be highly attractive.

Another object of this invention is the provision of a finish on an artificial bait which will have a highly brilliant and iridescent effect and which will be attractive in appearance and useful in service.

A further object of this invention is the provision of means for the attachment of hooks or a line to the body of the bait which means are strong and durable and may be easily formed on the artificial bait.

A still further object of this invention is the provision of a lip which will cause the bait to dive and which may be firmly secured to the artificial bait in a position to assist in holding the parts of the bait together.

With these and other objects in view, the invention consists of certain novel features of construction, as will be more fully described, and particularly pointed out in the appended claims.

In the accompanying drawing:

Fig. 1 is a perspective view of the bait formed in accordance with my invention.

Fig. 2 is a perspective view of one of the halves of the bait viewed from the inner side thereof.

Fig. 3 is a top plan view of this half, illustrating in dotted lines a complimentary half for completing the bait.

Fig. 4 is a perspective view of the diving lip, illustrating its shape to conform to the shape of the surface of the body itself.

Fig. 5 is a side elevation of one-half of the artificial bait showing in section the lip as secured thereto.

Fig. 6 is a sectional view on line 6—6 of Fig. 5.

Fig. 7 is a sectional view on line 7—7 of Fig. 1, illustrating the coatings applied to the artificial bait.

Fig. 8 is a longitudinal sectional view of a portion of the tail.

In the use of artificial bait, it has been found difficult to provide a metal bait which will float, also difficult to provide eyes which may be securely attached to the body of the bait without loosening and pulling therefrom, and further, the provision of a scale effect has usually been procured by painting the same on the body of the bait which is an expensive operation, and one which will not give a particularly attractive life-like effect, and in order to avoid these undesirable results and provide an attractive artificial bait I have stamped sheet metal into hollowed-out halves and embossed thereon the animate features of a fish, minnow or the like and brought these halves together securing them along their meeting edges to provide a hollow artificial metal bait of an attractive appearance to enhance, which, I have silver plated or provided some plate of a silver-like appearance on the body and then lacquered the same so as to provide an iridescent effect, and in order that attaching eyes may be formed which are strong and durable I have formed these integral with each of the halves in position to register when the halves are secured together, whereby no separate attachment is necessary and no joint provided for loosening, and in order to strengthen the attachment of the halves of the body and also to provide a diving lip I have formed the lip concave along its attaching surface to conform to the shape of the body and have secured it across the meeting edges to assist in holding the parts together; and the following is a detailed description of the present embodiment of this invention illustrating the preferred means by which these advantageous results may be accomplished.

With reference to the drawing, 10 designates one of the halves of the body of the artificial bait which is struck up from sheet metal stock of uniform thickness to provide a concave inner surface 11 and a convex outer surface 12 on which there are embossed the animate features of a fish consisting of the eye 13, scales 14, fins 15, mouth 16 and the like, and these features being formed by projections and recesses on the outer surface constitute corresponding oppositely shaped recesses and projections on the inner surface of the body.

Attaching means comprising projections or eyes 17, 18 and 19 are formed integral with each half of the body when struck out from sheet stock, each of which is pierced as at 20 and are concaved on the inner surface as illustrated at 21 in Fig. 3 to strengthen the same.

I have illustrated in Fig. 2 one of the halves of the body and it will be understood that a similar complimentary half is provided so the edges 22 of which halves will abut throughout their extended length to be joined together by solder or any other suitable means to form a water-tight joint. The pierced projections abut to strengthen each other and being soldered along their edges form an eye which is strong and firmly attached to the body so that it may not be easily dislodged.

In order that the bait may dive, a lip 23 is provided at the front end thereof which consists of a piece of sheet stock bent to provide a portion 24 which is concave as at 25 to fit and conform to the convex outer surface of the body of the bait, and this convex portion is secured across the seam or joint of the halves of the bait so as to assist in strengthening the joint and holding the parts together, and as this lip is located at the forward end adjacent the eye 19 it strengthens the bait where the greatest pull is exerted for drawing the bait through the water.

A bait thus formed is light in weight and has the characteristic appearance of a fish, but in order that the same will be more effective in its use and appearance I provide a plated coating 26 on the outer surface of the body which is usually silver or some substance having a silver-like appearance, and then I lacquer this plated covering as at 27 with the lacquer which will give an iridescent effect such as is common in fishes, and by this finish I provide a highly brilliant and reflective surface which is effective in use and extremely attractive to a purchaser.

It is of course understood that hooks may be secured to the eyes 17 and 18 and that any desired number of eyes may be similarly formed about the body of the bait.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. An artificial bait comprising a hollow elongated metal body formed in halves with the meeting edges of the halves forming a water tight seal along their length, and a diving lip having a securing surface conforming to the shape of the body and a diving surface at an angle to the securing surface, the body having two coatings, the inner coating having a silvery appearance, and the outer coating having an iridescent appearance.

2. An artificial bait comprising a hollow elongated metal body formed in halves with the meeting edges of the halves forming a water tight seal along their length, and a diving lip having a securing surface conforming to the shape of the body and a diving surface at an angle to the securing surface, the body being provided with a coating having a silvery appearance.

In testimony whereof I affix my signature.

AUSTIN V. McKENZIE.